United States Patent Office 3,453,268
Patented July 1, 1969

1

3,453,268
SUBSTITUTED v-TRIAZOLYL-2-STILBENES AND THEIR USE FOR BRIGHTENING MATERIALS
Alfons Dorlars and Otto Neuner, Leverkusen, and Rolf Putter, Duesseldorf, Germany, assignors to Farbenfabriken Bayer Aktiengesellschaft, Leverkusen, Germany, a corporation of Germany
No Drawing. Filed Jan. 5, 1967, Ser. No. 607,391
Claims priority, application Germany, Jan. 18, 1966, F 48,193; Feb. 17, 1966, F 48,452
Int. Cl. C09b 23/14, 55/00; C07d 55/02
U.S. Cl. 260—240                                  4 Claims

ABSTRACT OF THE DISCLOSURE

An aryl substituted v-triazolyl-2-stilbene and use as brightening agents when applied to polyesters, polyvinyl chloride, cellulose acetate or lacquers based on cellulose acetate.

---

The present invention particularly relates to brightening agents consisting essentially of blue-fluorescent v-triazolyl-2-stilbene compounds of the formula

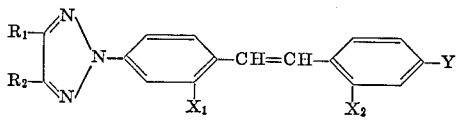

wherein $R_1$ stands for halogen, cyano, an acylated amino group, the carboxylic acid group, a carboxylic acid ester group or an optionally substituted carboxylic acid amide group, and $R_2$ stands for an optionally substituted aryl radical, while $X_1$ and $X_2$, independently of each other, denote hydrogen, the sulphonic acid group, a sulphonic acid ester group, an optionally substituted sulphonic acid amide group, an alkylsulphone or arylsulphone group, the carboxylic acid group, a carboxylic acid ester group, an optionally substituted carboxylic acid amide group or cyano, and Y stands for hydrogen, halogen, an acylated amino group, an optionally substituted v-triazolyl group or an optionally substituted pyrazolyl group.

As substituents of the carboxylic acid amide groups and sulphonic acid amide groups for which the symbols $R_1$ and $X_1$ and $X_2$ may stand, alkyl and aryl radicals are mentioned; as aryl radical $R_2$, above, all the phenyl and the naphthyl radicals are elgible and as substituents for these there are mentioned, for example, halogen, cyano and alkyl, alkoxy, acylamino, sulphonic acid, sulphonamide, alkylsulphone and arylsulphone groups. As substituents of the v-triazolyl and pyrazolyl groups for which the symbol Y may stand, alkyl groups and the substituents for which the symbols $R_1$ and $R_2$ may stand are eligible; the v-triazolyl groups for which the symbol Y may stand can also be benzotriazolyl and naphthotriazolyl groups which may be substituted by alkyl, alkoxy and/or sulphonic acid groups.

The brightening agents of the present invention are suitable as such or in the form of their salts, particularly in the form of their alkali metal salts or in the form of their salts with amines, for the brightening of a great variety of materials, for example for brightening cellulose materials, such as cotton and paper, or of wool, furthermore for the brightening of synthetic materials, such as fibres, filaments, films or plastic masses of polyamides, polyesters, polyacrylonitrile, polyvinyl chloride and cellulose acetates and also for the brightening of lacquers consisting of cellulose acetates, or for brightening soap. For the brightening of cotton and synthetic polyamides, preferably those v-triazolyl-(2)-stilbene compounds are suitable which correspond to the Formula I when Y stands for an optionally substituted v-triazolyl-(2) or pyrazolyl-(1) radical and $X_1$ and $X_2$ denote the sulphonic acid group, while those compounds which correspond to the Formula I but are free from sulphonic acid groups are mainly suitable for the brightening of materials consisting of polyesters, polyvinyl chloride and cellulose acetates and for brightening lacquers consisting of cellulose acetates.

The brightening agents may be used in conventional manner, e.g., in the form of aqueous solutions or dispersions or in the form of solutions in organic solvents, such as ethyleneglycol monomethyl ether, dimethylformamide and triethanolamine. If desired, the brightening agents may also be used in combination with washing agents or added to casting compositions which serve for the preparation of films or filaments. Brightening agents which contain carboxylic acid groups, carboxylic acid ester groups or carboxylic acid amide groups may also be used in the preparation of fluorescent shaped articles of synthetic polycondensates according to the process of the British patent specification No. 827,745. The necessary amounts can easily be determined in each case by preliminary experiments; in general, amounts of 0.1 to 1% by weight, referred to the material to be brightened, have proved sufficient.

Symmetrical brightening agents which correspond to the Formula I when $R_1$ stands for an acylated amino group, halogen or cyano and $R_2$ has the meaning stated above can be obtained, for example, by condensing bis-hydrazinostilbene compounds of the formula

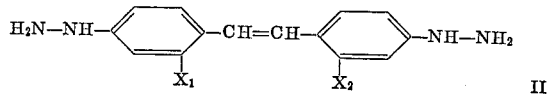

wherein $X_1$ and $X_2$ have the same meaning as above with 1,2,4-oxadiazoles of the formula

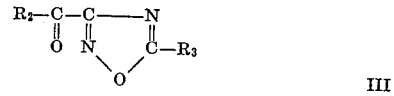

wherein $R_2$ has the same meaning as the above and $R_3$ stands for an optionally substituted alkyl or aryl radical, for instance, with 3-benzoyl-5-methyl-1,2,4-oxadiazole, 3-toluyl-5-methyl-1,2,4-oxadiazole or 3-benzoyl-5-phenyl-1,2,4-oxadiazole and converting the resultant bis-hydrazones into the bis-[v-triazolyl-(2)]-stilbene compounds of the formula

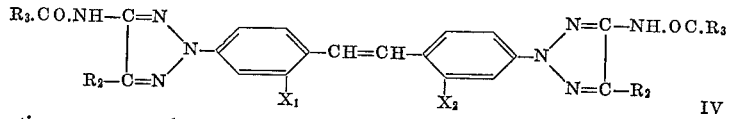

whereupon the two acylated amino groups $R_3.CO.NH-$ may be hydrolyzed to form the free amino groups which are then combined with a different acyl radical or diazotized and replaced by halogen or cyano according to Sandmeyer.

These symmetrical brightening agents can also be obtained by coupling diazo compounds of diaminostilbene compounds of the formula

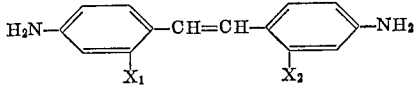

wherein $X_1$ and $X_2$ have the meaning stated above with α-nitroketoximes of the formula

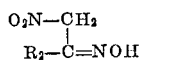

for instance, with ω-nitroacetophenoneoxime, converting the resultant disazo compounds into the corresponding bis-nitrotriazolyl-(2)-stilbene compounds and reducing the nitro groups to amino groups whereupon the amino groups are acylated or diazotized and replaced by halogen or cyanogen according to Sandmeyer.

Symmetrical brightening agents which correspond to the Formula I when $R_1$ stands for cyano, the carboxylic acid group, an optionally substituted carboxylic acid amide group and $R_2$ has the meaning stated above are obtainable for example by coupling diazo compounds of diaminostilbene compounds of the Formula V with appropriate enamines of the formula

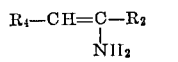

wherein $R_2$ has the meaning stated above and $R_4$ stands for cyano, the carboxylic acid group, a carboxylic acid ester group or an optionally substituted carboxylic acid amide group, or with their tautomeric ketimides, for instance with β-aminocinnamic acid nitrile, β-aminocinnamic acid methyl or ethyl ester, or β-aminocinnamic acid amide, converting the resultant disazo compounds into the copper complexes, transforming these into the bis-[v-triazolyl-(2)-stilbene compounds by heating and, if desired, hydrolysing the cyano, carboxylic acid ester or carboxylic acid amide group to the carboxylic acid group.

Unsymmetrical brightening agents which correspond to the Formula I when Y stands for hydrogen, halogen, or an optionally substituted v-triazolyl or pyrazolyl group can also be prepared by converting the hydrazino group of monohydrazinostilbene compounds of the formula

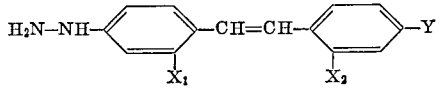

or the diazotized amino group of diazo compounds of monoaminostilbene compounds of the formula

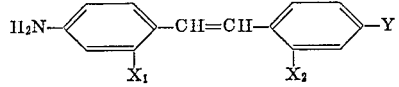

wherein $X_1$ and $X_2$ have the meaning stated above and Y stands for hydrogen, halogen or an optionally substituted v-triazolyl or pyrazolyl group with the aid of 1,2,4-oxadiazoles of the Formula III, α-nitroketoximes of the Formula VI or of enamines of the Formula VII or their tautomeric ketimides into the grouping

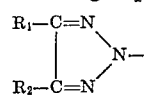

in the manner described above for the production of the symmetrically built brightening agents.

The brightening effects obtained by the agents of the present invention are surprisingly fast to light and chlorine.

The following examples serve to illustrate the invention without, however, limiting its scope.

EXAMPLE 1

Cotton fabric is moved for 30 minutes at 40-50° C. in a liquor ratio of 1:20 in an aqueous bath which contains, per litre, 0.06 g. of the brightening agent of the formula

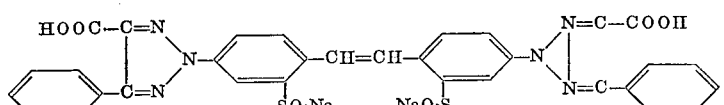

Unsymmetrical brightening agents of the Formula I can for example be obtained by converting monohydrazino stilbene compounds of the formula

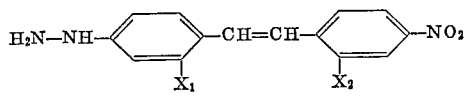

or diazo compounds of monoaminostilbene compounds of the formula

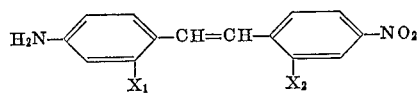

wherein $X_1$ and $X_2$ have the meaning stated above, with the aid of 1,2,4-oxadiazoles of the Formula III, α-nitroketoximes of the Formula VI or enamines of the Formula VII or their tautomeric ketimides in the manner explained for the preparation of the symmetrically built brightening agents, into mono-[v-triazolyl-(2)]-stilbene compounds of the formula

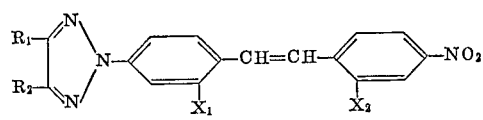

reducing the nitro group into the amino group and converting the amino group in known manner into the substituent Y of the meaning given at the beginning.

The fabric is then washed and dried. It shows a clear, neutral brightening which possesses very good fastness to light and chlorine.

The brightening agent used was prepared in the following manner:

A diazo suspension obtained in the usual manner by diazotisation of 37 g. 4,4' - diaminostilbene - 2,2' - disulphonic acid was added at 10° C., with stirring, to a solution of 40 g. β-aminocinnamic acid ethyl ester in 800 ml. alcohol, the reaction of the coupling mixture constantly being kept mildly acetic acid by adding concentrated aqueous sodium acetate solution. After coupling was ended the disazo compound formed was filtered off with suction, dissolved in 2 liters of 60% alcohol, and a solution of 100 g. crystallised copper-II-sulphate in a mixture of 150 ml. of water and 125 ml. concentrated aqueous ammonia was added. The reaction mixture was then heated for 3 hours on a water bath, the alcohol being gradually distilled off under reduced pressure. After the mixture was cold and sodium chloride solution had been added to it, the precipitated reaction product was filtered off with suction and boiled out with hot, dilute sodium hydroxide solution. The alkaline extracts were filtered and sodium chloride was added to them. The precipitated product was filtered off and purified by repeated recrystallisation from water to which a little sodium hydroxide solution and sodium dithionite had been added. After this the product was dissolved in hot water, the solution was acidified with acetic acid and sodium chloride was added to it, and the precipitate formed was filtered off and dried. The brightening agent so obtained is a pale yellow powder which dissolves in water with blue fluorescence.

Similar brightening effects are obtained when instead of the brightening agent described above the same amount of a compound of the formula

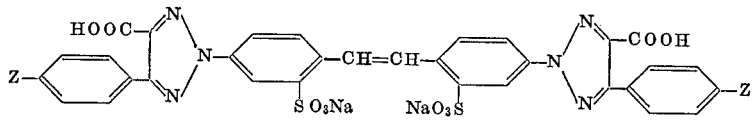

wherein Z stands for $CH_3$, $OCH_3$, or Cl is used. These brightening agents were prepared by applying 43 g. of β-amino-β-(p-tolyl)-acrylic acid ethyl ester, β-amino-β-(p-methoxyphenyl)-acrylic acid ethyl ester or β-amino-β-(p-chlorophenyl)-acrylic acid ethyl ester instead of 40 g. of β-aminocinnamic acid ethyl ester in the process described above.

EXAMPLE 2

Unbleached cotton yarn is treated at 85 to 95° C. for one hour in a liquor ratio 1:20 in an aqueous bath which contains, per liter, 2 g. sodium chlorite and 0.06 g. of one of the brightening agents mentioned in Example 1. After washing and drying, the treated yarn shows a clear brightening of good fastness to light.

EXAMPLE 3

White washing is washed for 30 minutes at 90 to 100° C. in a liquor ratio 1:20 in a wash liquor which contains, per litre, 10 g. of a commercial anion-active washing agent and 0.05 g. of one of the brightening agents mentioned in Example 1. After washing and drying, the washed material shows an outstanding brightening of very good fastness to light.

EXAMPLE 4

Fabrics consisting of fibres which were prepared from poly-ε-caprolactam are moved for 30 minutes at 80–90° C. in a liquor ratio 1:40 in an aqueous bath which contains, per liter, 2 g. sodium chlorite and 0.2 g. of one of the brightening agents mentioned in Example 1 or of the brightening agent of the formula

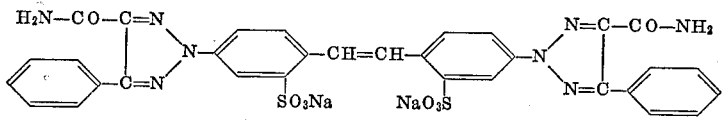

After washing and drying, the fabrics show a clear brightening of very good fastness to light.

The brightening agent of the above formula was prepared by following the method described in Example 1 but applying instead of 40 g. aminocinnamic acid ethyl ester 33 g. β-aminocinnamic acid amide. The brightening agent so obtained is likewise a pale yellow powder which dissolves in water with blue fluorescence.

Excellent brightening effects are likewise obtained when using in a quantity of 0.2 g. per liter one of the compounds of the formula

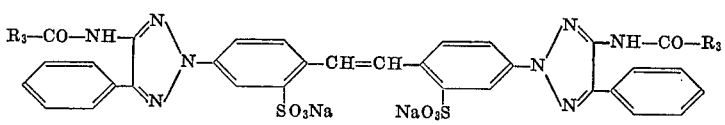

wherein $R^3$ stands for $CH_3$ or $C(CH_3)_3$.

These brightening agents were prepared in the following manner:

A diazo suspension obtained in the usual manner by diazotization of 37 g. 4,4′-diaminostilbene-2,2′-disulphonic acid was added at 10° C., with stirring, to a solution of 40 g. ω-nitroacetophenoneoxime in 500 ml. ethyl alcohol, the pH-value of the reaction mixture being adjusted to about 5 by the addition of sodium acetate. After coupling was ended 50 ml. concentrated aqueous sodium chloride solution was added with stirring. The disazo compound formed was filtered off with suction, dried in a vacuum and pulverized. The resulting oximino-nitrohydrazone which contained sodium chloride was suspended with 40 g. anhydrous sodium acetate in 800 ml. acetic anhydride at room temperature. The suspension was mixed with 250 ml. dimethylformamide and stirred for 6 hours while the temperature was raised gradually to 80° C. After the acetic acid and the main portion of the excess acetic anhydride had been distilled off at reduced pressure, the residue was stirred in water and filtered off with suction. The crude nitrotriazole thus obtained was purified by recrystallization from isopropanol/water, then dissolved in 400 ml. dimethylformamide and reduced with hydrogen to the aminotriazole compound at a maximum temperature of 50° C. in the presence of Raney nickel catalyst. The catalyst was filtered off and the filtrate was concentrated in a vacuum. The aminotriazole compound which precipitated in the form of yellow crystals was filtered off with suction, washed with cold methanol and dried. It was then acylated in pyridine with acetic anhydride or pivaloyl chloride respectively. Finally the brightening agents thus obtained were recrystallized from aqueous ethanol.

EXAMPLE 5

A fabric consisting of filaments which were prepared from hexamethylene-adipic acid polymer is moved for 30 minutes at 80 to 90° C. in a liquor ratio 1:40 in an aqueous bath which contains, per liter, 0.2 g. of one of the brightening agents mentioned in Example 1. After washing and drying, the fabric thus treated shows a strong, clear brightening, which possesses very good fastness to light and chlorite.

Similarly good results are achieved when, instead of the brightening agents mentioned in Examle 1, the same amount of the compound of the formula

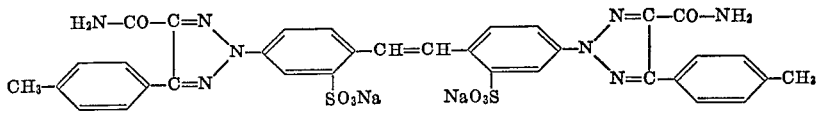

is used.

This brightening agent was prepared by following the method described in Example 1 but applying 39 g. β-amino-β-(p-tolyl)-acrylic acid amide instead of 40 g. β-aminocinnamic acid ethyl ester. It is a pale yellow powder which dissolves in water with blue fluorescence.

EXAMPLE 6

A mixture of 900 g. ε-caprolactam, 100 g. ω-aminocaproic acid, 0.5 g. acetic acid, 13.5 g. titanium dioxide and 4 g. of one of the brightening agents mentioned in Example 1, in the first paragraph of Example 4 or in the second paragraph of Example 5 are heated to 260° C. in a stainless steel container for 5 hours at atmospheric pressure. The polyamide melt which is formed is processed into chips in known manner and the chips are then spun into filaments with a final titre of 90/25. The light-fastness and the fastnesses to wetting of the brightening achieved are outstanding.

We claim:
1. A compound of the formula

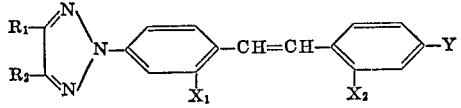

wherein $R_1$ is carboxy;
$R_2$ is phenyl, lower alkyl phenyl, lower alkoxyphenyl or chlorophenyl;
$X_1$ and $X_2$ are —$SO_3Na$, and
Y is a 4-carboxy-1,2,3-v-triazolyl radical having as the 5-substituent a member selected from the group consisting of phenyl, lower alkyl phenyl, lower alkoxyphenyl and chlorophenyl.

2. A compound of the formula

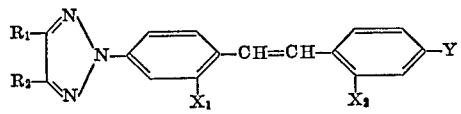

wherein $R_1$ is a halo, cyano, lower alkanoylamino, benzoylamino, methyl benzoylamino, carboxylic acid, carboxylic acid alkyl ester having 1-4 carbon atoms in the alkyl group, or carbamyl;

$R_2$ is phenyl, naphthyl or the corresponding substituted radicals having as substituents a member selected from the group consisting of halo, cyano, alkyl, alkoxy, acylamino, sulfonic acid, sulfonamido, alkylsulfone and arylsulfone;

$X_1$ and $X_2$ are independently defined as a hydrogen, sulfonic acid, the corresponding alkali metal or amine salt of sulfonic acid, sulfonic acid ester, sulfonic acid amide, alkyl-sulfone, phenyl-sulfone, carboxylic acid, carboxylic acid ester, carbamyl or cyano; and Y is defined as hydrogen; halo; benzotriazolyl; naphthotriazolyl; the corresponding substituted rings having as substituents members selected from the group consisting of alkyl, alkoxy, and sulfonic acid groups; v-triazolyl-(2); and v-triazolyl-(2) having as substituents a member selected from the group consisting of $R_1$ and $R_2$.

3. A compound of the formula

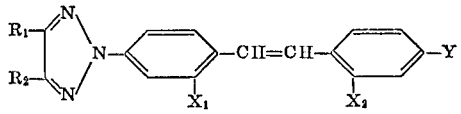

wherein $R_1$ is carboxy, carbamyl and lower alkanoylamino;
$R_2$ is phenyl, lower alkyl phenyl, lower alkoxyphenyl or chlorophenyl;
$X_1$ and $X_2$ are $SO_3Na$; and
Y is a 1,2,3,-v-triazolyl radical having as substituents $R_1$ and $R_2$.

4. The compound of claim 2 wherein $R_1$ is a member selected from the group consisting of carbamyl, acetamido and tertiary butyl carbonyl-substituted amino;
$R_2$ is phenyl, methylphenyl or chlorophenyl;
$X_1$ and $X_2$ are —$SO_3Na$;
Y is a member selected from the group consisting of 4-carbamyl-5-phenyl-v-triazolyl-(2)-4-lower alkyl carbonyl amino, 5-phenyl-v-triazolyl-(2), and 4-carbamyl-5-methylphenyl-v-triazolyl-(2).

References Cited

UNITED STATES PATENTS 2,901,476   8/1959   Gold et al.

JOHN D. RANDOLPH, *Primary Examiner.*

U.S. Cl. X.R.

106—176; 117—33.5; 252—117, 301.2; 260—37